(No Model.)
T. C. PURVES.
APPARATUS FOR CLEANING STEAM BOILERS.
No. 276,627. Patented May 1, 1883.
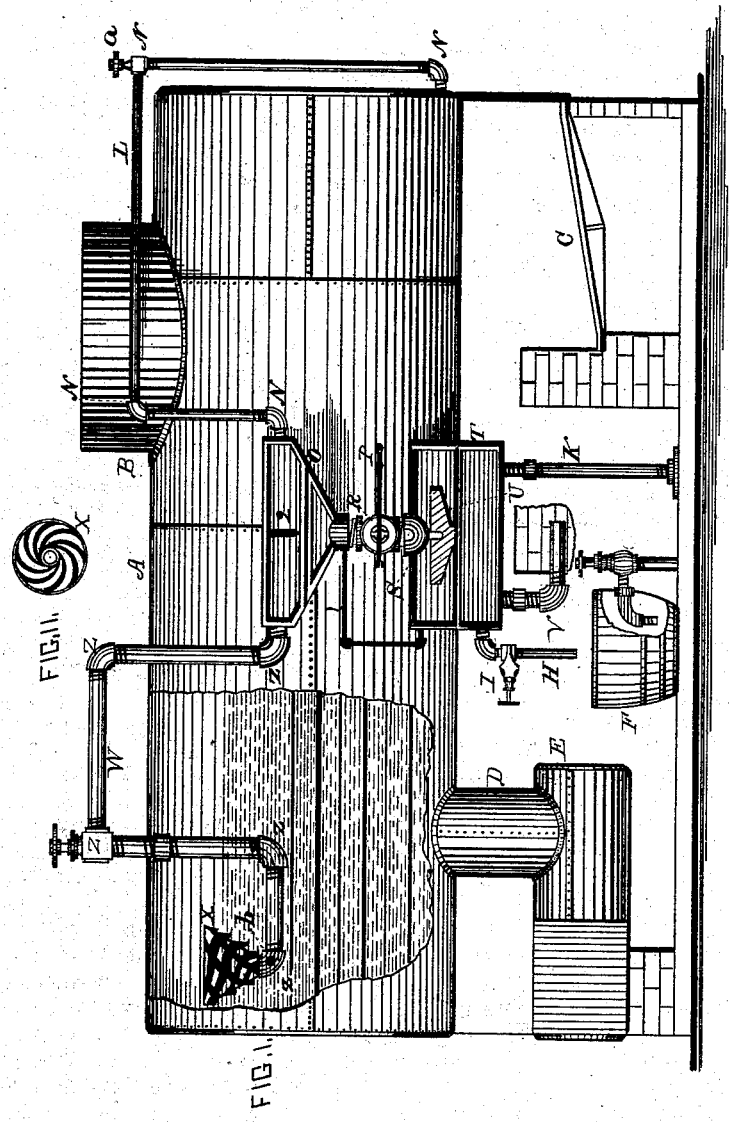
WITNESSES.
Adolf Heild.
J. S. Huey
INVENTOR.
Thomas C. Purves.
By G. L. Chapin, Atty.

UNITED STATES PATENT OFFICE.

THOMAS C. PURVES, OF CHICAGO, ILLINOIS.

APPARATUS FOR CLEANING STEAM-BOILERS.

SPECIFICATION forming part of Letters Patent No. 276,627, dated May 1, 1883.

Application filed November 3, 1882. (No model.)

*To all whom it may concern:*

Be it known that I, THOMAS CURTIS PURVES, of Chicago, county of Cook, and State of Illinois, have invented new and useful Improvements in Apparatus for Cleaning Steam-Boilers, of which the following is a specification, reference being had to the accompanying drawings, illustrating the invention, in which—

Figure 1 is a sectional longitudinal elevation of a steam-boiler furnace, a steam-boiler, and my improved cleaning apparatus attached; Fig. 2, a plan or top of the skimmer.

The present apparatus relates to that means which are employed to gather the scum or sediment on the water surface and remove it from the boiler so fast as the impurities accumulate automatically.

The invention is an improvement made on the boiler-cleaners patented to me on March 19 and May 28, 1878; and its nature, in brief, consists in the novel construction of the skimmer, which in general contour is an inverted truncated cone, and provided with a series of spiral openings running from the top to the bottom thereof, whereby the higher the foam or the scum rises the greater the area on the skimmer it is subjected to, the spiral form of the openings in the skimmer aiding in giving to the water at the receiving-pipe a rotary motion, drawing sediment to it; and, further, in the use of larger pipes to connect the skimmer with the trap than are employed at the opposite end of the trap, whereby there is less friction in the water leading to the trap than from it, and consequently the sediment falls into the trap at about the point where the friction begins to increase; and also in the arrangement of the pipes, whereby the apparatus is more effective in its use. It is proper to state that the apparatus as now shown is in public use and gives entire satisfaction, it having been made in the present form as the result of practical experience.

A represents the steam-boiler, C the furnace, B the dome, and D E the mud-cylinder, of ordinary construction.

W Z represent a continuous pipe, extending from near the rear end of the boiler, at its inside, up through the boiler-plate, and it is brought down and connected with the upper portion of the trap O T, placed below the top of the boiler, as shown. At the opposite end of the same part of the trap is a pipe, L, which is brought above the trap, and, by means of elbows N, is made continuous and connected with the lower front part of the boiler, a cock, $a$, being interposed between the boiler and trap to shut off the circulation. The trap O T has the construction shown in the patent dated May the 28th, 1878, and referred to, including the valve P, interposed in a pipe communicating with it.

K represents the trap-support; H I, the blow-off pipe and cock at the bottom of the trap.

V represents a blow-off pipe, which may be employed to convey the impurities to the outside of the building-wall, a hole, U, being made through the wall for that purpose. Where the impurities are not to be conducted off by the pipe V a tub, F, may receive them from the pipe H. In the drawings the boiler is not shown to be incased; but where a casing be employed the pipe W must be put through it, should the top of the boiler be covered, so as to reach the trap placed on the outside of the casing. The small pipe $l$ is made to communicate with the lower end of the upper portion of the trap and with the upper end of the lower portion thereof, and with the same end to which the blow-off pipe is attached, whereby when the large valve P is closed the force coming to and passing through said small pipe cleans out the lower part of the upper part of the trap and drives the impurities out of the lower part thereof. The small pipe $l$, being placed in the same end of the lower part of the trap that blow-off pipe H is placed, direct the incoming force against the opposite end of the trap, where the force is broken, after which the returning force drives the impurities out of the lower trap without cutting through them, as a direct force would. As a result a speedy action of the apparatus is attained.

From the drawings it will be seen that the pipes W L extend above the skimmer or gatherer X and above the trap, thus of themselves forming a part of the trap. In practice it is found that the pipe W should be about one and one-fourth of an inch in diameter, and the pipe L be three-fourths of an inch, to insure a slower movement and less friction of the water in the large pipe—that is, the pipe leading from the skimmer to the trap—than from the trap to the front end of the boiler. By this means a greater quantity of impurities can be trapped than when the two pipes are of the same size. This feature of elevating the water before it enters the trap, so that a considerable force of gravity may act on the impurities to bring them into the trap, and at the same time elevating the water after it leaves the trap by a smaller pipe, I consider new and very important in removing sediment from steam-boilers, and a means not before employed for that purpose. The skimmer X is formed larger at the top, and through the sides thereof are formed a series of curved slots, freely to admit the sediment from the water. By this means the greater the height of scum or foam the greater surface in the skimmer it is exposed to. As water passing through a hole takes a rotary form, the curves in the skimmer conform nearly to the movement of the water, so that sediment is freely deposited in the pipe, and from there carried to the trap. I prefer in practice that the metal between curved slots be vertical; but any skimmer provided with curved slots and made larger at the top than at its connection with pipe W would embrace my invention and answer well the purpose.

In the drawings much has been shown that is old and well known, that the particular improvement herein claimed may be well understood.

I claim as new and desire to secure by Letters Patent of the United States—

1. In a steam-boiler-cleaning apparatus, the skimmer X, made larger at the top, and provided with a series of curved slots extending from the top downward, as and for the purpose specified.

2. In apparatus for cleaning steam-boilers, the pipes W L, elevated above the trap, and the pipe W, larger than the pipe L, arranged to operate substantially as and for the purpose set forth.

3. The combination of the skimmer X, constructed as specified, with the elevated pipes W L, the trap O T, and the small pipe *l*, communicating with the same end of the trap as the blow-off pipe H, substantially as specified and shown.

THOMAS CURTIS PURVES.

Witnesses:
G. L. CHAPIN,
J. S. HUEY.